United States Patent [19]

Kamiyama et al.

[11] Patent Number: 4,830,447
[45] Date of Patent: May 16, 1989

[54] OPTICAL WAVELENGTH CONVERSION DEVICE

[75] Inventors: Kozi Kamiyama; Yoji Okazaki; Masaki Okazaki; Seiiti Kubodera; Syozo Takeuchi, all of Kanagawa, Japan

[73] Assignee: Fuji Photo Film Co., Ltd., Kanagawa, Japan

[21] Appl. No.: 154,709

[22] Filed: Feb. 11, 1988

[30] Foreign Application Priority Data

Feb. 13, 1987 [JP] Japan ................................ 62-30784
Mar. 18, 1987 [JP] Japan ................................ 62-63075
Dec. 7, 1987 [JP] Japan ............................... 62-309145

[51] Int. Cl.$^4$ .............................................. G02B 6/10
[52] U.S. Cl. .................................. 350/96.12; 307/425
[58] Field of Search ............... 350/96.11, 96.12, 96.15, 350/96.13, 96.29, 96.34; 307/425, 427

[56] References Cited

U.S. PATENT DOCUMENTS 4,427,260 1/1984 Puech et al. ..................... 307/427 X
4,523,806 6/1985 Kojima et al. .................... 350/96.25
4,701,012 10/1987 Kaiser ............................. 350/96.16
4,739,168 4/1988 Aoki ............................. 350/96.27 X

FOREIGN PATENT DOCUMENTS 60-250334 7/1985 Japan .

OTHER PUBLICATIONS

Bulletin of Fine Optics Research Group, Meetings of The Japan Society of Applied Physics, vol. 3, No. 2, pp. 28-32.
Fundamentals of Optoelectronics by A. Yariv, pp. 200-204.
Nonlinear Optical Properties of Organic and Polymeric Materials, ACS Symposium Series 223, D. J. Williams, American Chemical Society, 1983.
Organic Nonlinear Optical Materials, CMC K.K., 1985.

Primary Examiner—William L. Sikes
Assistant Examiner—Akm E. Ullah
Attorney, Agent, or Firm—Sughrue, Mion, Zinn, Macpeak & Seas

[57] ABSTRACT

An optical wavelength conversion device is composed of an organic nonlinear optical material, and a cladding layer having a refractive index lower than the refractive index of the organic nonlinear optical material and covering the organic nonlinear optical material, thereby to convert a fundamental wave entering the optical wavelength conversion device to a second harmonic, and to radiate the second harmonic. At least one of device edge faces including edge faces of the organic nonlinear optical material is provided with a shielding layer for shielding the device edge face from ambient atmosphere, thereby to prevent the organic nonlinear optical material from sublimation and deterioration.

26 Claims, 3 Drawing Sheets

OPTICAL WAVELENGTH CONVERSION DEVICE

BACKGROUND OF THE INVENTION

1. Field of the Invention

This invention relates to an optical wavelength conversion device for converting an optical fundamental wave entering the device to an optical second harmonic having a wavelength one half the wavelength of the fundamental wave. This invention particularly relates to an optical wavelength conversion device using an organic nonlinear optical material.

2. Description of the Prior Art

Various attempts have heretofore been made to convert the wavelength of a laser beam to a shorter wavelength by utilization of optical second harmonic generation using a nonlinear optical material. As an optical wwavelength conversion device for carrying out wavelength conversion in this manner, there has heretofore been known a bulk crystal type device as described in, for example, "Hikari Electronics No Kiso" (Fundamentals of Optoelectronics) by A. Yariv, translated by Kunio Tada et al., Maruzen K.K., pp. 200–204. However, the bulk crystal type optical wavelength conversion device has the drawback that double refraction by a crystal is utilized for satisfying the phase matching conditions, and therefore a material which exhibits large nonlinearity, but exhibits no or little double refraction, cannot be utilized.

As one of optical wavelength conversion devices that eliminate the aforesaid drawback, a fiber type device has heretofore been proposed. The fiber type optical wavelength conversion device is constituted by an optical fiber comprising a cladding and a core which is formed of a nonlinear optical material and which is filled inward of the cladding. An example of the fiber type optical wavelength conversion device is described in Bulletin of Fine Optics Research Group, Meetings of The Japan Society of Applied Physics, Vol. 3, No. 2, pp. 28–32. The fiber type optical wavelength conversion device has the advantage that phase matching between the fundamental wave and the second harmonic can be achieved easily, and therefore extensive research has been conducted in recent years on the fiber type optical wavelength conversion device. Also, as disclosed in, for example, Japanese patent application Nos. 61(1986)-159292 and 61(1986)-159293, there has heretofore been proposed an optical waveguide type optical wavelength conversion device comprising two substrates as cladding layers, and an optical waveguide formed of a nonlinear optical material and disposed between the two substrates. The optical waveguide type optical wavelength conversion device also has the aforesaid advantage.

In recent years, it has been proposed to employ a single-crystal organic nonlinear optical material as the nonlinear optical material in the fiber type optical wavelength conversion device and the optical waveguide type optical wavelength conversion device. The organic nonlinear optical material has a nonlinear optical constant markedly larger than that of an inorganic material, and therefore a high wavelength conversion efficiency can be obtained by use of the organic nonlinear optical material. As the organic nonlinear optical material, it is possible to use, for example, 2-methyl-4-nitroaniline (MNA), methanitroaniline (mNA), 3-methyl-4-nitropyridine-1-oxide (POM), or urea as disclosed in Japanese unexamined patent publication No. 60(1985)-250334; "Nonlinear Optical Properties of Organic and Polymeric Materials", ACS SYMPOSIUM SERIES 223, David J. Williams, American Chemical Society, 1983; and "Yuki Hisenkei Kogaku Zairyo" (Organic Nonlinear Optical Materials), Masao Kato, et al., CMC K.K., 1985. As the organic nonlinear optical material, it is also possible to use 3,5-dimethyl-1-4-nitrophenyl)pyrazole, 3,5-dimethyl-1-(4-nitrophenyl)-1,2,4-triazole, 2-ethyl-1-(4-nitrophenyl)imidazole, 1-(4-nitrophenyl)pyrrole, 2-dimethylamino-1-5-nitroacetanilide, 5-nitro-2-pyrrolidinoacetanilide, or 3-methyl-4-nitropyridine-N-oxide as proposed in Japanese patent application No. 61(1986)-53884. For example, MNA has a wavelength conversion efficiency approxiemtely 2,000 times the wavelength conversion efficiency of $LiNbO_3$ as an inorganic nonlinear optical material. Therefore, in the case where the optical wavelength conversion device is formed by use of the organic nonlinear optical material, a short wavelength laser beam of blue region can be obtained by generating a second harmonic from an infrared laser beam emitted as the fundamental wave from a popular small and low-cost semiconductor laser.

However, the fiber type optical wavelength conversion device obtained by forming the optical fiber core by use of the aforesaid organic nonlinear optical material or the optical waveguide type optical wavelength conversion device obtained by forming the optical waveguide by use of the aforesaid organic nonlinear optical material has the drawback that the wavelength conversion efficiency and the entry coupling efficiency of the fundamental wave deteriorate markedly with the passage of time. Specifically, the organic nonlinear optical material constituting the optical wavelength conversion device contacts the ambient atmosphere such as ambient air at its edge faces. Therefore, the organic nonlinear optical material sublimes from the edge faces to cause shortening of the single crystal part, or becomes modified from the single crystal condition. As a result, the aforesaid problems arise.

SUMMARY OF THE INVENTION

The primary object of the present invention is to provide an optical wavelength conversion device wherein the wavelength conversion efficiency of the organic nonlinear optical material is prevented from deteriorating.

Another object of the present invention is to provide an optical wavelength convesion device wherein the entry coupling efficiency of the fundamental wave is maintained high.

The present invention provides an optical wavelength conversion device composed of an organic nonlinear optical material, and a cladding layer having a refractive index lower than the refractive index of the organic nonlinear optical material and covering the organic nonlinear optical material, thereby to convert a fundamental wave entering the optical wavelength conversion device to a second harmonic, and to radiate the second harmonic, wherein the improvement comprises providing at least one of device edge faces including edge faces of said organic nonlinear optical material with a shielding layer for shielding said device edge face from ambient atmosphere.

The shielding layer prevents the edge face of the organic nonlinear optical material from directly contacting ambient atmosphere such as ambient air, and prevents the organic nonlinear optical material from sublimation and deterioration.

In the case where the shielding layer is formed on the device edge face from which the second harmonic is radiated, the shielding layer should preferably be formed as a filter layer for transmitting the second harmonic and absorbing the fundamental wave. In this case, it is not necessary to provide a filter for separating the second harmonic and the fundamental wave from each other independently of the optical wavelength conversion device as with the conventional technique, and the optical wavelength conversion device can be made smaller.

The shielding layer may be formed as an ordinary coating layer, or as a cap-like structure fitted and secured to the edge portion of the optical wavelength conversion device. The shielding layer formed of the cap-like structure is advantageous in that shielding of the device edge face from the ambient atmosphere becomes reliable since no problem arises with regard to peeling off, and the shielding layer can be formed easily and can be utilized as a device holding means.

With the optical wavelength conversion device in accordance with the present invention wherein the shielding layer is formed on at least one of the device edge faces including the edge faces of the organic nonlinear optical material, sublimation and deterioration of the organic nonlinear optical material can be prevented reliably. Therefore, the wavelength conversion efficiency of the organic nonlinear optical material can be prevented from deteriorating. In the case where the edge face on which the shielding layer is formed is utilized as the entry edge face for the fundamental wave, the entry coupling efficiency of the fundamental wave can be maintained high. In the case where the shielding layer is provided on the radiation edge face, the radiation efficiency of the second harmonic can be improved by decreasing reflection.

DESCRIPTION OF THE PREFERRED EMBODIMENTS

The present invention will hereinbelow be described in further detail with reference to the accompanying drawings.

First embodiment

Figure 1:
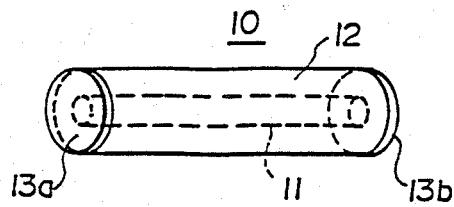
FIGS. 1 and 2 are a perspective view and a schematic side view showing a first embodiment of the optical wavelength conversion device in accordance with the present invention.
Figure 2:
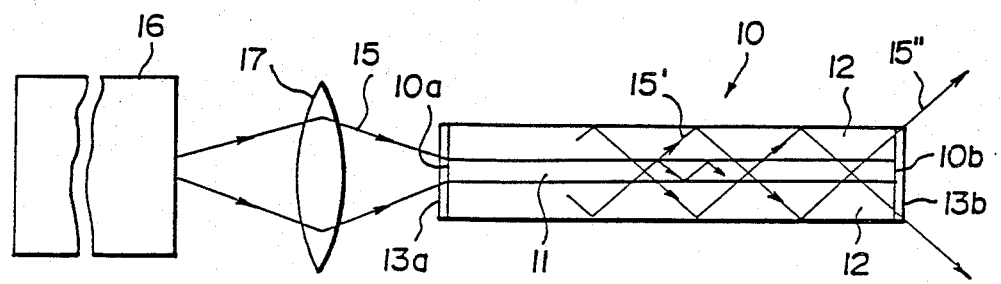

With reference to FIGS. 1 and 2, an optical wavelength conversion device 10 is constituted by an optical fiber comprising a cladding 12 and a core 11 formed of a nonlinear optical material and filled in a hollow region at the center of the cladding 12. As the nonlinear optical material, an organic nonlinear optical material having a high wavelength conversion efficiency is used. Particularly, in this embodiment, the core 11 is formed of MNA. Also, shielding layers 13a and 13b are formed respectively on device edge faces 10a and 10b including the edge faces of the core 11 formed of MNA.

Figure 3:
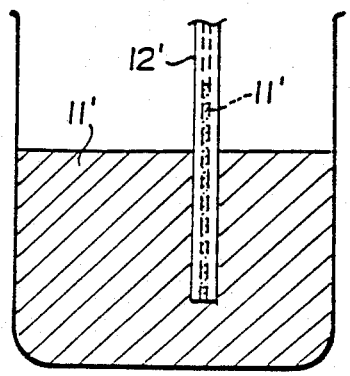
FIG. 3 is a schematic view showing the method of making the optical wavelength conversion device shown in FIG. 1, FIGS. 4 and 5 are schematic perspective views showing third and fourth embodiments of the optical wavelength conversion device in accordance with the present invention.

The method of making the optical wavelength conversion device 10 will hereinbelow be described with reference to FIG. 3 by taking the case where the core 11 is formed by MNA, the cladding 12 is formed of pyrex glass, and the shielding layers 13a and 13b are formed of polytrifluoroisopropyl methacrylate, as an example. First, a hollow glass fiber 12' for forming the cladding 12 is prepared. By way of example, the glass fiber 12' has an outer diameter of approximately 100 μm, and a diameter of the hollow region within the range of approximately 2 μm to 10 μm. Then, MNA 11' is kept in a melt condition in a furnace or the like, and one end of the glass fiber 12' is dipped in the molten MNA 11'. As a result, the molten MNA 11' enters the hollow region of the glass fiber 12' by capillary action. In order to prevent the molten MNA 11' from decomposing, the temperature of the molten MNA 11' is kept at a value slightly higher than the melting point (132° C.) thereof. Thereafter, the glass fiber 12' is quenched to convert the MNA 11' in the hollow region into a polycrystalline condition.

The glass fiber 12' should more preferably be gradually drawn from the furnace maintained at a temperature higher than the melting point of the MNA 11' to the exterior thereof maintained at a temperature lower than said melting point, thereby to convert the molten MNA 11' to the single crystal condition at the draw-out region to the exterior of the furnace. In this manner, the core 11 consisting of the MNA in the markedly long single crystal condition having a uniform crystal orientation is formed, and therefore the optical wavelength conversion device 10 can be made substantially long. As is well known, the wavelength conversion efficiency of the optical wavelength conversion device of this type is proportional to the length of the optical wavelength conversion device, and the practical value of the optical wavelength conversion device increases as the length thereof increases.

After the core 11 is filled in the hollow region of the glass fiber 12' in the manner as mentioned above, the glass fiber 12' is cut to an appropriate length. Polytrifluoroisopropyl methacrylate is then applied to both edge faces of the thus cut glass fiber 12', thereby to form the shielding layers 13a and 13b on the edge faces. By way of example, the formation of the shielding layers 13a and 13b is carried out by dissolving 20 g of polytrifluoroisopropyl methacrylate in 1 liter of methyl ethyl ketone to prepare a coating solution, dipping both edge faces of the glass fiber 12' in the coating solution, and drying the coating solution applied on the edge faces. In this manner, the optical wavelength conversion device 10 as shown in FIGS. 1 and 2 is obtained. By way of example, each of the shielding layers 13a and 13b is formed to have a thickness of approximtely 1 μm.

The optical wavelength conversion device 10 is used in the manner as shown in FIG. 2. Specifically, a fundamental wave 15 is made to enter the core 11 from an entry edge face 10a of the optical wavelength conversion device 10. A Q-switch YAG laser (wavelength: 1,060 nm) 16 is used as the fundamental wave generating means, and a laser beam (fundamental wave) 15 guided by an objective lens 17 is made to impinge upon the device edge face 10a at the core region via the shielding layer 13a, thereby to make the laser beam 15 enter the optical wavelength conversion device 10. The fundamental wave 15 is converted by the MNA constituting the core 11 to a second harmonic 15' having a wavelength one half the wavelength of the fundamental wave 15. The second harmonic 15' advances inside of the optical wavelength conversion device 10 by repeating total reflection among the outer surface regions of the cladding 12. By way of example, phase matching is effected between the guided mode of the fundamental wave 15 through the core and the radiation mode of the second harmonic 15' to the cladding 12 (in the case of Cherenkov radiation).

A beam 15" including the second harmonic 15' is radiated out of a radiation edge face 10b of the optical wavelength conversion device 10. The radiated beam 15" passes through the shielding layer 13b and is radiated out of the optical wavelength conversion device 10. The radiated beam 15" is then passed through a filter (not shown), and the second harmonic 15' alone is thus taken up for usage.

Refractive indexes n1, n2 and n3 of the MNA, pyrex glass and polytrifluoroisopropyl methacrylate respectively constituting the core 11, the cladding 12 and the shielding layers 13a and 13b will now be described below. By way of example, the refractive indexes with respect to the YAG laser beam having the wavelength of 1,060 nm are as shown below.

n1: 1.496
n2: 1.464
n3: 1.41 where the value of n1=1.496 is the effective refractive index. In the case where the shielding layer 13a is formed of a material having a refractive index lower than the refractive indexes of the core 11 and the cladding 12, reflection of the fundamental wave 15 by the device edge face decreases and the entry efficiency of the fundamental wave 15 is increased as compared with the case where no shielding layer 13a is provided.

Also, in the case where the aforesaid shielding layers 13a and 13b are provided, the core 11 consisting of the MNA as an organic material does not directly contact the ambient atmosphere such as ambient air, and therefore the core 11 can be prevented from sublimation and deterioration. The effects of prevention of sublimation and deterioration will now be described in detail below.

The optical wavelength conversion device 10 of the aforesaid embodiment in accordance with the present invention and an optical wavelength conversion device made in the same manner as the optical wavelength conversion device 10, except that the shielding layers 13a and 13b were not provided, were left to stand for two weeks in air at a temperature of 25° C. and humidity of 10%. Then, for each of the optical wavelength conversion devices, changes of the edge faces of the core 11 were investigated. In the case of the optical wavelength conversion device provided with no shielding layers 13a and 13b, changes by sublimation or deterioration were observed in the region over a length of 10 μm from the core edge faces. On the other hand, in the case of the optical wavelength conversion device 10 provided with the shielding layers 13a and 13b in accordance with the present invention, no change was observed.

Also for optical wavelength conversion devices comprising a core formed of 3,5-dimethyl-1-(4-nitrophenyl)-pyrazole and optical wavelength conversion devices comprising a core formed of 3,5-dimethyl-1-(4-nitrophenyl)-1,2,4-triazole, the effects of the shielding layers on prevention of sublimation or deterioration were investigated under the same temperature and humidity conditions as mentioned above. In the case of the former optical wavelength conversion devices, the device provided with no shielding layer exhibited changes by sublimation or deterioration in a region over a length of 40 μm from the core edge faces, whereas the device provided with the shielding layers exhibited no change. Also, in the case of the latter optical wavelength conversion devices, the device provided with no shielding layer exhibited changes by sublimation or deterioration in a region over a length of 20 μm from the core edge faces, whereas the device provided with the shielding layers exhibited no change.

Second embodiment

A second embodiment of the optical wavelength conversion device in accordance with the present invention will be described hereinbelow. The second embodiment of the optical wavelength conversion device is formed in the same manner as the optical wavelength conversion device 10 of the first embodiment, except that the material of the shielding layers 13a and 13b as mentioned above with reference to FIGS. 1 and 2 is different from the material used in the first embodiment. Therefore, the second embodiment will be described below by utilizing the same reference numerals as in FIGS. 1 and 2. In the second embodiment, the shielding layers 13a and 13b are formed of a trifluoroethylacrylic acid polymer. Specifically, the formation of the shielding layers 13a and 13b is carried out by, for example, dissolving 20 g of the trifluoroethylacrylic acid polymer in 1 liter of methyl ethyl ketone to prepare a coating solution for shielding layer 13a, dissolving 20 g of the trifluoroethylacrylic acid polymer and 1 g of the dye represented by the following formula:

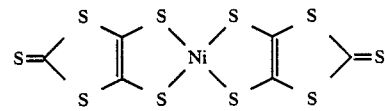

in 1 liter of methyl ethyl ketone to prepare a coating solution for the shielding layer 13b on the second harmonic radiation side, applying the coating solutions respectively to the edge faces of the glass fiber 12', and drying the coating solutions applied to the edge faces. In this manner, the optical wavelength conversion device 10 as shown in FIGS. 1 and 2 is obtained. By way of example, each of the shielding layers 13a and 13b is formed to have a thickness within the range of several microns to several tens of microns.

The optical wavelength conversion device obtained in this manner is used in the same manner as the optical wavelength conversion device 10 as shown in FIG. 2. Specifically, the beam 15" as a mixture of the second harmonic 15' with the fundamental wave 15 is radiated out of the radiation edge face 10b of the optical wavelength conversion device. The radiated beam 15" passes through the shielding layer 13b and is radiated out of the optical wavelength conversion device. The molecular extinction coefficient ε of the aforesaid dye contained in the shielding layer 13b is 15,000 with respect to the fundamental wave 15 having a wavelength of 1,060 nm, and is 1,500 with respect to the second harmonic 15' having a wavelength of 530 nm. Therefore, the shielding layer 13b acts in the same manner as a filter for absorbing almost all of the fundamental wave 15 and substantially transmitting the second harmonic 15', and the second harmonic 15' alone is taken up via the shielding layer 13b is utilized.

Refractive indexes n1, n2 and n3 of the MNA, the pyrex glass and the trifluoroethylacrylic acid polymer respectively constituting the core 11, the cladding 12 and the shielding layers 13a and 13b will now be described below. By way of example, the refractive indexes with respect to the YAG laser beam having the wavelength of 1,060 nm are as shown below.

n1: 1.496
n2: 1.464
n3: 1.407 where the value of n1 = 1.496 is the effective refractive index. Also in this case where the shielding layer 13a is formed of a material having a refractive index lower than the refractive indexes of the core 11 and the cladding 12, reflection of the fundamental wave 15 by the device edge face decreases and the entry efficiency of the fundamental wave 15 is increased as compared with the case where no shielding layer 13a is provided.

Also, in the case where the aforesaid shielding layers 13a and 13b are provided, the core 11 consisting of the MNA as an organic material does not directly contact the ambient atmosphere such as ambient air, and therefore the core 11 can be prevented from sublimation and deterioration. The effects of prevention of sublimation and deterioration will now be described in detail below.

The aforesaid second embodiment of the optical wavelength conversion device in accordance with the present invention and an optical wavelength conversion device made in the same manner as the second embodiment of the optical wavelength conversion device, except that the shielding layers 13a and 13b were not provided, were left to stand for two weeks in air at a temperature of 25° C. and humidity of 10%. Then, for each of the optical wavelength conversion devices, changes of the edge faces of the core 11 were investigated. In the case of the optical wavelength conversion device provided with no shielding layers 13a and 13b, changes by sublimation or deterioration were observed in the region over a length of 10 μm from the core edge faces. On the other hand, in the case of the second embodiment of the optical wavelength conversion device provided with the shielding layers 13a and 13b in accordance with the present invention, no change was observed.

Also for optical wavelength conversion devices comprising a core formed of 3,5-dimethyl-1-(4-nitrophenyl)-pyrazole and optical wavelength conversion devices comprising a core formed of 3,5-dimethyl-1-(4-nitrophenyl)-1,2,4-triazole, the effects of the shielding layers on prevention of sublimation or deterioration were investigated under the same temperature and humidity conditions as mentioned above. In the case of the former optical wavelength conversion devices, the device provided with no shielding layer exhibited changes by sublimation or deterioration in a region over a length of 40 μm from the core edge faces, whereas the device provided with the shielding layers exhibited no change. Also, in the case of the latter optical wavelength conversion devices, the device provided with no shielding layer exhibited changes by sublimation or deterioration in a region over a length of 20 μm from the core edge faces, whereas the device provided with the shielding layers exhibited no change.

Third embodiment

Figure 4:
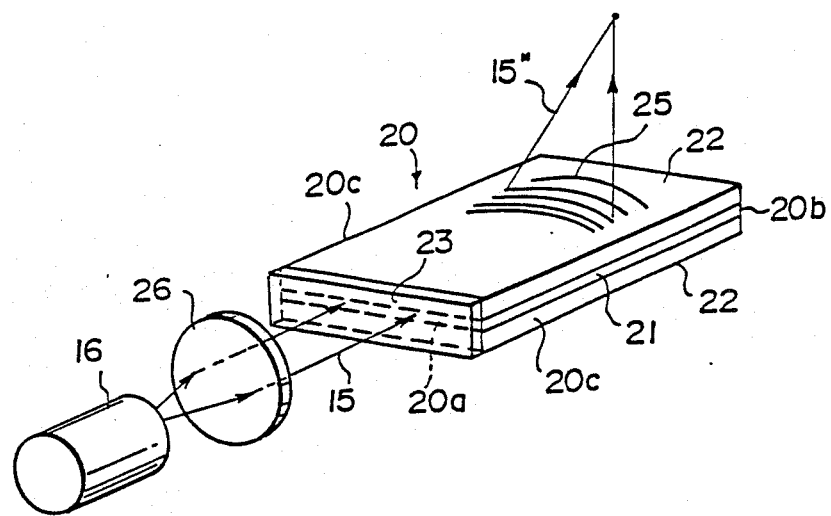

A third embodiment of the optical wavelength conversion device in accordance with the present invention will be described hereinbelow with reference to FIG. 4. An optical wavelength conversion device 20 shown in FIG. 4 is of the optical waveguide type, and comprises glass substrates 22, 22 as the cladding layers, and an optical waveguide 21 formed therebetween by filling an organic nonlinear optical material. A shielding layer 23 is formed on a device edge face 20a acting as the light entry end face. The optical waveguide 21, the glass substrates 22, 22, and the shielding layer 23 may be formed respectively of the aforesaid MNA, pyrex glass and polytrifluoroisopropyl methacrylate. Also, filling of the MNA between the glass substrates 22, 22 and the formation of the shielding layer 23 may be carried out basically in the same manner as mentioned above with reference to the first embodiment. The method of forming the optical waveguide by filling the organic nonlinear optical material between the glass substrates 22, 22 is described in detail in, for example, Japanese patent application Nos. 61(1986)-159292 and 61(1986)-159293.

Also, a focusing grating coupler (hereinafter referred to as FGC) 25 for radiation of the second harmonic is formed on the upper surface of the upper glass substrate 22, i.e. on the surface thereof opposite to the optical waveguide 21.

Effects of the optical wavelength conversion device 20 of the third embodiment having the aforesaid configuration will be described below. By way of example, the aforesaid YAG laser 16 is used as the fundamental wave generating means, and the laser beam (fundamental wave) 15 guided by a collimator lens 26 is made to impinge upon the device edge face 20a via the shielding layer 23. In this manner, the laser beam 15 can be entered to the optical waveguide 21. The second harmonic is produced from the laser beam 15 as the fundamental wave, and the light beam 15" including the second harmonic is radiated out of the FGC 25 on the glass substrate 22 and is converged to a single spot.

Also with the optical wavelength conversion device 20 of the third embodiment wherein the shielding layer 23 is formed on the device edge face 20a including the edge face of the optical waveguide 21, the same effects as the provision of the shielding layer 13a in the optical wavelength conversion device 10 of the first embodiment can be obtained.

In the third embodiment, the shielding layer 23 is formed on only the device edge face 20a acting as the fundamental wave entry edge face. However, such shielding layers may be formed also on device edge faces 20b and 20c, 20c from which no fundamental wave is entered and from which no second harmonic is radiated, thereby to prevent the optical waveguide 21 formed of the organic nonlinear optical material from deteriorating.

Also, instead of making the fundamental wave enter the optical wavelength conversion device 20 from the device edge face 20a, the aforesaid focusing grating coupler or a linear grating coupler may be formed on the inner surface of the glass substrate 22, i.e. on the surface thereof facing the optical waveguide 21, and the fundamental wave may be made to enter the optical waveguide 21 via the grating coupler. In the case where entry of the fundamental wave and radiation of the second harmonic are effected via the grating couplers, the organic nonlinear optical material can be prevented from gradually subliming or deteriorating from the device edge face side by providing the device edge face with the shielding layer.

In the case where entry of the fundamental wave and radiation of the second harmonic are carried out at the edge faces, the same effects as mentioned above can be achieved by forming the shielding layers on the device edge faces including the entry and radiation edge faces.

Fourth embodiment

Figure 5:
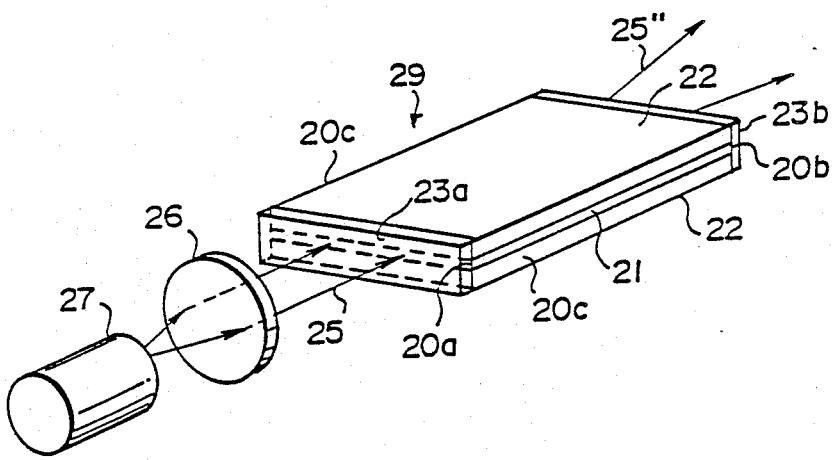

A fourth embodiment of the optical wavelength conversion device in accordance with the present invention will be described hereinbelow with reference to FIG. 5. An optical wavelength conversion device 29 shown in FIG. 5 is of the optical waveguide type as in the case of the third embodiment, and comprises the glass substrates 22, 22 as the cladding layers, and the optical waveguide 21 formed therebetween by filling an organic nonlinear optical material. Shielding layers 23a and 23b are formed respectively on the device edge face 20a acting as the light entry end face and the device edge face 20b acting as the light radiation edge face. The optical waveguide 21 and the glass substrates 22, 22 may be formed respectively of the aforesaid MNA and pyrex glass. Also, filling of the MNA between the glass substrates 22, 22 and the formation of the shielding layers 23a and 23b may be carried out basically in the same manner as mentioned above with reference to the first, second and third embodiments. In the fourth embodiment, the formation of the shielding layers 23a and 23b is carried out by dissolving 10 g of a pentafluoropropylacrylic acid polymer in 1 liter of methylene chloride to prepare a coating solution for the shielding layer 23a, dissolving 10 g of the pentafluoropropylacrylic acid polymer and 0.1 g of the dye represented by the following formula:

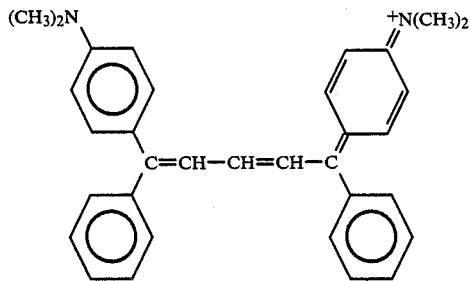

in 1 liter of methylene chloride to prepare a coating solution for the shielding layer 23b on the second harmonic radiation side, applying the coating solutions respectively to the device edge faces 20a and 20b, and drying the coating solutions applied to the edge faces.

Effects of the optical wavelength conversion device 29 of the fourth embodiment having the aforesaid configuration will be described below. By way of example, a semiconductor laser 27 is used as the fundamental wave generating means, and a laser beam (fundamental wave) 25 having a wavelength of 840 nm guided by the collimator lens 26 is made to impinge upon the device edge face 20a via the shielding layer 23a. In this manner, the laser beam 25 can be entered to the optical waveguide 21. The refractive index of the pentafluoropropylacrylic acid polymer constituting the shielding layers 23a and 23b with respect to light having a wavelength of 840 nm is 1.385. The second harmonic is produced from the laser beam 25 as the fundamental wave, and the light beam 15" including the second harmonic is radiated out of the device edge face 20b. The molecular extinction coefficient $\epsilon$ of the aforesaid dye contained in the shielding layer 23b on the device edge face 20b is 200,000 with respect to the fundamental wave 25 having a wavelength of 840 nm, and is 15,000 with respect to the second harmonic having a wavelength of 420 nm. Therefore, the almost all of the fundamental wave 25 is absorbed by the shielding layer 23b, and the second harmonic substantially passes through the shielding layer 23b. Therefore, the second harmonic alone is substantially taken out of the optical wavelength conversion device 29.

Also with the optical wavelength conversion device 29 of the fourth embodiment wherein the shielding layers 23a and 23b are formed on the device edge faces 20a and 20b including the edge faces of the optical waveguide 21, the effects of prevention of sublimation and deterioration of the optical waveguide 21 can be obtained by the shielding layers 23a and 23b.

Also, with the fourth embodiment wherein the shielding layer formed on the second harmonic radiation edge face acts in the same manner as the filter layer and the second harmonic alone can be taken out of the optical wavelength conversion device, the optical wavelength conversion device can be made smaller than the case where a filter for separating the second harmonic and the fundamental wave from each other is provided independently. This effect is obtained also with the aforesaid second embodiment.

Fifth embodiment

Figure 6:
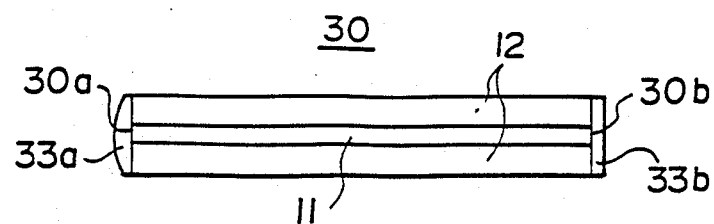
FIG. 6 is a schematic side view showing a fifth embodiment of the optical wavelength conversion device in accordance with the present invention.

A fifth embodiment of the optical wavelength conversion device in accordance with the present invention will hereinbelow be described with reference to FIG. 6. An optical wavelength conversion device 30 shown in FIG. 6 is formed basically in the same manner as the optical wavelength conversion device 10 of the first embodiment. However, a shielding layer 33a on a fundamental wave entry edge face 30a is formed to hve a curved surface and to act in the same manner as a condensing lens. With this configuration of the optical wavelength conversion device 30, no condensing lens need be provided independently, and therefore the optical wavelength conversion device can be made smaller and simpler.

In this embodiment, a shielding layer 33b on the second harmonic radiation edge face may be formed as a filter layer for transmitting the second harmonic and absorbing the fundamental wave as in the second and fourth embodiments.

Sixth embodiment

Figure 7:
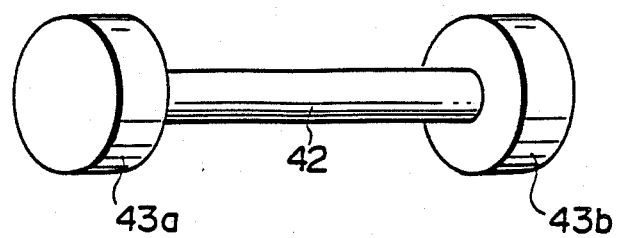
FIGS. 7 and 8 are a perspective view and a sectional side view showing a sixth embodiment of the optical wavelength conversion device in accordance with the present invention.
Figure 8:
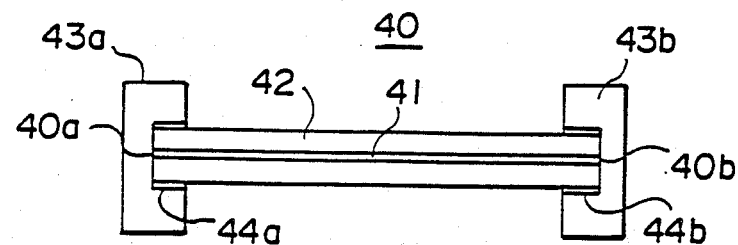

A sixth embodiment of the optical wavelength conversion device in accordance with the present invention will hereinbelow be described with reference to FIGS. 7 and 8. An optical wavelength conversion device 40 shown in FIG. 7 is basically of the optical fiber type as in the case of the optical wavelength conversion device 10 of the first embodiment, and comprises a cladding 42 and a core 41 filled in the hollow region at the center of the cladding 42. In this embodiment, the core 41 is formed of a material obtained by converting the nonlinear optical material, i.e. 3,5-dimethyl-1-(4-nitrophenyl)-pyrazole (hereinafter referred to as PRA), represented by the following molecular formula

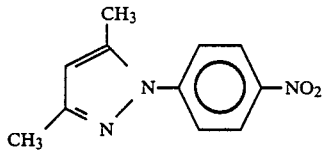

into the single crystal condition. PRA is described in detail in Japanese patent application No. 61(1986)-53884. Also in this embodiment, the cladding 42 is formed of SF10 glass. The optical fiber comprising the cladding 42 and the core 41 formed of such materials can be made in the same manner as described with reference to, for example, the first embodiment.

Cap-like structures 43a and 43b are closely contacted respectively with a device edge face 40a on the fundamental wave entry side and a device edge face 40b on the second harmonic radiation side. Each of the cap-like structures 43a and 43b has a cylindrical recess at its center, and is secured to the optical fiber by the fitting of the peripheral part of the recess onto the end of the fiber. In this embodiment, the cap-like structures 43a and 43b are formed of polymethyl methacrylate (PMMA), and the inner circumferential surfaces of the recesses of the cap-like structures 43a and 43b are adhered respectively by adhesive layers 44a and 44b consisting of, for example, an epoxy adhesive or a polyurethane-adhesive, to the outer circumferential surfaces of the optical wavelength conversion device 40 in the vicinity of the device edge faces 40a and 40b.

The cap-like structures 43a and 43b act in the same manner as the shielding layers for shielding the device edge faces 40a and 40b from the ambient atmosphere, and therefore the same effects as with the aforesaid embodiments are obtained.

In this embodiment, the refractive indexes n1, n2 and n3 of the core 41 formed of PRA, the cladding 42 formed of SF10 glass, and the cap-like structure (shielding layer) 43a formed of PMMA with respect to, for example, the YAG laser beam having a wavelength of 1,064 nm are as shown below.

n1: 1.77
n2: 1.67
n3: 1.48

Also in this case where the shielding layer 43a is formed of a material having a refractive index lower than the refractive indexes of the core 41 and the cladding 42, reflection of the fundamental wave by the device edge face decreases and the entry efficiency of the fundamental wave is increased as compared with the case where no shielding layer 43a is provided.

The cap-like structures 43a and 43b can be made easily by a known forming process. Therefore, in the case where large numbers of the optical wavelength conversion devices provided with the shielding layers are made, the cap-like structures 43a and 43b as the shielding layers can be provided on the devices more easily and at a higher operating efficiency than in the case where the coating solutions for the formation of the shielding layers are applied to the device edge faces and dried.

The ends of the cladding 42 should preferably be tapered toward the edge faces, or the recesses of the cap-like structures 43a and 43b should preferably be tapered. In this case, the fitting operation for the cap-like structures 43a and 43b is facilitated. In this case where the outer circumferential surface of the cladding 42 is scratched at the time the cap-like structures 43a and 43b are fitted onto the cladding 42, the second harmonic is scattered at the scratched region. In order to prevent such problems, an optical fiber device comprising a second cladding formed outward of the cladding filled with the core as proposed in, for example, Japanese patent application No. 62(1987)-32914 should preferably be used.

In the case where the aforesaid second cladding is not provided and a holding means is directly mounted on the cladding 42 for holding the optical wavelength conversion device 40, the cladding 42 often becomes scratched at the mounting region and the second harmonic is scattered at the scratched region. However, with the optical wavelength conversion device 40 in accordance with the present invention, the cap-like structures 43a and 43b can be utilized as the regions held by the device holding means, and therefore the aforesaid problems can be eliminated.

Seventh embodiment

Figure 9:
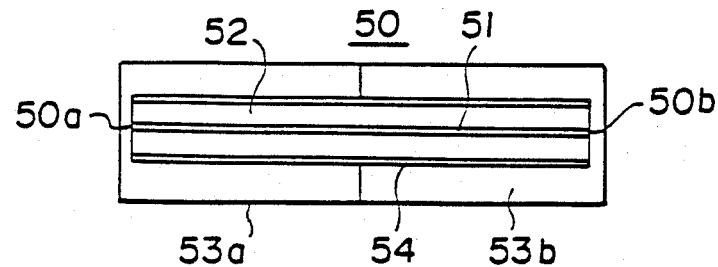
FIG. 9 is a sectional side view showing a seventh embodiment of the optical wavelength conversion device in accordance with the present invention.

A seventh embodiment of the optical wavelength conversion device in accordance with the present invention will hereinbelow be described with reference to FIG. 9. With reference to FIG. 9, a core 51 and a cladding 52 of an optical wavelength conversion device 50 are of the same types as in the sixth embodiment, and cap-like structures 53a and 53b as the shielding layers are formed of the same material as the cap-like structures 43a and 43b in the sixth embodiment. However, in the seventh embodiment, the cap-like structures 53a and 53b are formed substantially long so that they cover the overall surface of the cladding 52. With this configuration, scratching of the cladding 52 can be prevented more reliably. In FIG. 9, reference numerals 50a and 50b denote the device edge faces, and reference numeral 54 denotes an adhesive layer.

In the case where the shielding layers are constituted by the aforesaid cap-like structures, the cap-like structure fitted to the device edge face from which the second harmonic is to be radiated may be formed as a filter layer. Also, the cap-like structure may be shaped in a lens form having the light condensing effects, or in the form adapted to fitting to the ends of the optical waveguide as shown in FIGS. 4 and 5.

As mentioned above, the shielding layers provided on the device edge faces may be formed of polytrifluoroisopropyl methacrylate, the trifluoroethylacrylic acid polymer, or PMMA. They may also be formed of a resin material such as a melamine resin, a polyester resin, an acrylic resin, a silicone resin, an epoxy resin, a polyvinyl chloride resin, a polyethylene resin, a polypropylene resin, a polyamide resin, an acetyl cellulose resin; glass such as silica glass; or a transparent oxide crystal such as $Al_2O_3$.

In the aforesaid embodiments, phase matching is effected between the guided mode of the fundamental wave through the core and the radiation mode of the second harmonic to the cladding. However, the present invention is also applicable to the optical wavelength conversion device of the type wherein both the fundamental wave and the second harmonic are guided through the core or the optical waveguide and phase matching is effected between the guided mode of the fundamental wave and the guided mode of the second harmonic.

We claim:

1. In an optical wavelength conversion device composed of an organic nonlinear optical material, and a cladding layer having a refractive index lower than the refractive index of the organic nonlinear optical material and covering the organic nonlinear optical material to convert a fundamental wave entering the optical wavelength conversion device to a second harmonic, and to radiate the second harmonic, the improvement comprising providing at least one edge face of the device, including edge faces of said organic nonlinear optical material, with a shielding layer for shielding said device edge face from ambient atmosphere while permitting at least one of said fundamental wave and said second harmonic to be transmitted therethrough.

2. A device as defined in claim 1 wherein one of the two edge faces opposite to each other among said device edge faces is formed as a fundamental wave entry edge face, and the other of said two edge faces is formed as a second harmonic radiation edge face.

3. A device as defined in claim 2 wherein at least one of the two shielding layers provided on said device edge faces is formed as a condensing lens.

4. A device as defined in claim 1 wherein the shielding layer provided on a fundamental wave entry edge face is formed of a material having a refractive index lower than the refractive index of said organic nonlinear optical material, and the shielding layer provided on a second harmonic radiation edge face is formed of a material having a refractive index lower than the refractive index of the cladding material.

5. A device as defined in claim 2 wherein the shielding layer provided on said fundamental wave entry edge face is formed of a material having a refractive index lower than the refractive index of said organic nonlinear optical material, and the shielding layer provided on said second harmonic radiation edge face is formed of a material having a refractive index lower than the refractive index of the cladding material.

6. A device as defined in claim 3 wherein the shielding layer provided on said fundamental wave entry edge face is formed of a material having a refractive index lower than the refractive index of said organic nonlinear optical material, and the shielding layer provided on said second harmonic radiation edge face is formed of a material having a refractive index lower than the refractive index of the cladding material.

7. A device as defined in claim 1 wherein the shielding layer provided on a device edge face from which said second harmonic is to be radiated is formed as a filter layer for transmitting said second harmonic and absorbing said fundamental wave.

8. A device as defined in claim 2 wherein the shielding layer provided on the device edge face from which said second harmonic is to be radiated is formed as a filter layer for transmitting said second harmonic and absorbing said fundamental wave.

9. A device as defined in claim 3 wherein the shielding layer provided on the device edge face from which said second harmonic is to be radiated is formed as a filter layer for transmitting said second harmonic and absorbing said fundamental wave.

10. A device as defined in claim 4 wherein the shielding layer provided on the device edge face from which said second harmonic is to be radiated is formed as a filter layer for transmitting said second harmonic and absorbing said fundamental wave.

11. A device as defined in claim 5 wherein the shielding layer provided on the device edge face from which said second harmonic is to be radiated is formed as a filter layer for transmitting said second harmonic and absorbing said fundamental wave.

12. A device as defined in claim 6 wherein the shielding layer provided on the device edge face from which said second harmonic is to be radiated is formed as a filter layer for transmitting said second harmonic and absorbing said fundamental wave.

13. A device as defined in claim 1 wherein said shielding layer is constituted by a cap-like structure fitted to a device end.

14. A device as defined in claim 2 wherein said shielding layer is constituted by a cap-like structure fitted to a device end.

15. A device as defined in claim 3 wherein said shielding layers are constituted by cap-like structures fitted to device ends.

16. A device as defined in claim 4 wherein said shielding layers are constituted by cap-like structures fitted to device ends.

17. A device as defined in claim 5 wherein said shielding layers are constituted by cap-like structures fitted to device ends.

18. A device as defined in claim 6 wherein said shielding layers are constituted by cap-like structures fitted to device ends.

19. A device as defined in claim 7 wherein said shielding layer is constituted by a cap-like structure fitted to a device end.

20. A device as defined in claim 8 wherein said shielding layer is constituted by a cap-like structure fitted to a device end.

21. A device as defined in claim 9 wherein said shielding layers are constituted by cap-like structures fitted to device ends.

22. A device as defined in claim 10 wherein said shielding layers are constituted by cap-like structures fitted to device ends.

23. A device as defined in claim 11 wherein said shielding layers are constituted by cap-like structures fitted to device ends.

24. A device as defined in claim 12 wherein said shielding layers are constituted by cap-like structures fitted to device ends.

25. A device as defined in any of claims 13, 14, 19 and 20 wherein said cap-like structure is formed to cover the overall surface of said cladding layer.

26. A device as defined in any of claims 15, 16, 17, 18, 21, 22, 23 and 24 wherein said cap-like structures are formed to cover the overall surface of said cladding layer.

* * * * *